United States Patent
Parhi et al.

(10) Patent No.: US 11,061,997 B2
(45) Date of Patent: Jul. 13, 2021

(54) DYNAMIC FUNCTIONAL OBFUSCATION

(71) Applicant: Regents of the University of Minnesota, Minneapolis, MN (US)

(72) Inventors: Keshab K. Parhi, Maple Grove, MN (US); Sandhya Koteshwara, Minneapolis, MN (US)

(73) Assignee: Regents of the University of Minnesota, Minneapolis, MN (US)

(*) Notice: Subject to any disclaimer, the term of this patent is extended or adjusted under 35 U.S.C. 154(b) by 356 days.

(21) Appl. No.: 15/667,776

(22) Filed: Aug. 3, 2017

(65) Prior Publication Data
US 2019/0042711 A1    Feb. 7, 2019

(51) Int. Cl.
| | | |
|---|---|---|
| G06F 21/14 | (2013.01) | |
| H04L 9/08 | (2006.01) | |
| G11B 20/00 | (2006.01) | |
| H04L 9/00 | (2006.01) | |

(52) U.S. Cl.
CPC .......... *G06F 21/14* (2013.01); *G11B 20/0021* (2013.01); *H04L 9/002* (2013.01); *H04L 9/0825* (2013.01); *H04L 2209/12* (2013.01); *H04L 2209/16* (2013.01)

(58) Field of Classification Search
CPC ....... G06F 21/14; H04L 9/0825; H04L 9/002; H04L 2209/16; H04L 9/003; H04L 9/0668; H04L 9/065; H04L 9/0869; H04L 2209/12; G11B 20/0021
USPC .......................................................... 713/190
See application file for complete search history.

(56) References Cited

U.S. PATENT DOCUMENTS

| | | | | |
|---|---|---|---|---|
| 5,274,800 A | * | 12/1993 | Babb ...................... | G06F 13/37 714/32 |
| 6,226,269 B1 | * | 5/2001 | Brewer ................. | H04L 49/555 370/245 |
| 6,438,728 B1 | * | 8/2002 | Susnow .............. | G06F 11/2226 714/807 |
| 6,572,106 B2 | * | 6/2003 | Alexoff ................. | A63F 3/0605 273/138.1 |
| 7,576,771 B1 | * | 8/2009 | Kotlowski ............... | H04N 5/04 348/194 |
| 7,587,590 B2 | * | 9/2009 | Yamada .................. | H04L 9/003 380/1 |
| 7,757,083 B2 | * | 7/2010 | Devadas ............... | H04L 9/3278 713/168 |

(Continued)

OTHER PUBLICATIONS

Koteshwara S, Kim CH, Parhi KK (2018) Key-based dynamic functional obfuscation of integrated circuits using sequentially triggered mode-based design. IEEE Trans Inf Forens Secure 13(1):79-93 (Year: 2018).*

(Continued)

*Primary Examiner* — Shahriar Zarrineh
(74) *Attorney, Agent, or Firm* — Theodore M. Magee; Westman, Champlin & Koehler, P.A.

(57) ABSTRACT

An apparatus includes a trigger generator and at least one multiplexer. The trigger generator is configured to generate a non-periodic trigger output. The at least one multiplexer is configured to output a valid control signal and an obfuscated control signal in response to a key value input. The obfuscated control signal is selectively set to one of a valid control signal and an invalid control signal based on the non-periodic trigger output.

18 Claims, 15 Drawing Sheets

(56) References Cited

U.S. PATENT DOCUMENTS

| | | | | |
|---|---|---|---|---|
| 8,990,276 | B2* | 3/2015 | Lazich | H04L 9/0877 708/250 |
| 9,509,497 | B2* | 11/2016 | Boehl | H04L 9/004 |
| 10,031,825 | B2* | 7/2018 | Litovtchenko | G06F 11/3041 |
| 10,055,587 | B2* | 8/2018 | Sethumadhavan | G06F 21/87 |
| 2002/0199042 | A1* | 12/2002 | Kim | G06F 5/065 710/51 |
| 2003/0006849 | A1* | 1/2003 | Janssen | H04L 9/0662 331/78 |
| 2003/0179078 | A1* | 9/2003 | Chen | G06K 7/0008 340/10.2 |
| 2003/0231766 | A1* | 12/2003 | Hanounik | H04L 9/0894 380/43 |
| 2004/0145984 | A1* | 7/2004 | Kadokawa | G11B 20/1496 369/47.35 |
| 2005/0054445 | A1* | 3/2005 | Gatto | G07F 17/3244 463/42 |
| 2006/0250192 | A1* | 11/2006 | Hsieh | H04L 7/033 331/16 |
| 2007/0133790 | A1* | 6/2007 | Chang | G06F 7/588 380/46 |
| 2008/0256366 | A1* | 10/2008 | Dale | H04L 9/0662 713/189 |
| 2008/0303572 | A1* | 12/2008 | Chang | H03K 3/84 327/164 |
| 2009/0172488 | A1* | 7/2009 | Hasegawa | G01R 31/318533 714/733 |
| 2009/0222672 | A1* | 9/2009 | Clarke | G06F 21/73 713/189 |
| 2009/0243675 | A1* | 10/2009 | Feng | G01R 31/31703 327/157 |
| 2010/0031061 | A1* | 2/2010 | Watanabe | G11B 20/00246 713/193 |
| 2011/0002461 | A1* | 1/2011 | Erhart | G06F 21/34 380/44 |
| 2013/0236005 | A1* | 9/2013 | Ikeda | H04L 9/003 380/28 |
| 2014/0040334 | A1* | 2/2014 | Burgess | G06F 21/72 708/235 |
| 2014/0250541 | A1* | 9/2014 | A/L Krishnasamy | G09C 1/00 726/34 |
| 2014/0351305 | A1* | 11/2014 | Hamilton | G06F 7/588 708/251 |
| 2014/0375353 | A1* | 12/2014 | Sinanoglu | G06F 30/327 326/8 |
| 2015/0046335 | A1* | 2/2015 | Huxham | G06Q 20/382 705/64 |
| 2015/0304102 | A1* | 10/2015 | Nakano | H04L 9/003 713/189 |
| 2016/0119136 | A1* | 4/2016 | Ma | H04L 9/003 380/28 |
| 2016/0140340 | A1* | 5/2016 | Walters | G06F 21/556 726/22 |
| 2016/0182229 | A1* | 6/2016 | Glickman | H04L 9/10 380/44 |
| 2017/0048061 | A1* | 2/2017 | Bohdan | H04L 9/0662 |
| 2017/0230337 | A1* | 8/2017 | Akhavain Mohammadi | H04L 63/04 |
| 2017/0264421 | A1* | 9/2017 | Walker | H03K 17/6872 |
| 2018/0232479 | A1* | 8/2018 | Sinanoglu | G06F 17/5068 |
| 2018/0359266 | A1* | 12/2018 | Andow | H04L 63/1416 |
| 2019/0018936 | A1* | 1/2019 | Zhou | G06F 21/14 |
| 2019/0199694 | A1* | 6/2019 | Albert | G06F 21/12 |
| 2020/0065456 | A1* | 2/2020 | Tehranipoor | H03K 19/17768 |

OTHER PUBLICATIONS

Jaxin Baby, N. Mohankumar, M. Nirmala Devi, Reconfigurable LUT-Based Dynamic Obfuscation for Hardware Security, Department of Electronics and Communication Engineering, Amrita School of Engineering Amrita Vishwa Vidyapeetham Coimbatore India, Advances in Electrical and Computer Technologies pp. 963-973 (Year: 2020).*

Alkabani et al., Remote activation of ICs for piracy prevention and digital right management, in Proceedings of the IEEE/ACM international conference on Computer-aided design, IEEE Press, pp. 674-677, 2007.

Ayinala et al., Pipelined parallel FFT architectures via folding transformation, IEEE Transactions on Very Large Scale Integration (VLSI) Systems, vol. 20, No. 6, pp. 1068-1081, 2012.

Bhunia et al., Hardware trojan attacks: threat analysis and countermeasures, in Proceedings of the IEEE, vol. 102, No. 8, pp. 1229-1247, 2014.

Chakraborty et al., Hardware protection and authentication through netlist level obfuscation, in Proceedings of the IEEE/ACM International Conference on Computer-aided design, pp. 674-677, 2008.

Chakraborty et al., HARPOON: an obfuscation-based SoC design methodology for hardware protection, IEEE Transactions of Computer-aided design of integrated circuits and systems, vol. 28, No. 10, pp. 1493-1502, 2009.

Chakraborty et al., Hardware trojan: threats and emerging solutions, in High Level Design Validation and Test Workshop, IEEE International, pp. 166-171, 2009.

Cui et al., Static and dynamic obfuscations of scan data against scan-based side-channel attacks, IEEE Transactions of Information Forensics and Security, vol. 12, No. 2, pp. 363-376, 2017.

Dupuis et al., A novel hardware logic encryption technique for thwarting illegal overproduction and hardware trojans, Proceedings in the IEEE 20th International On-Line Testing Symposium, pp. 49-54, 2014.

Ethenet MAC 10/100 Mbps, [Online], https://opencores.org/project,ethmac, 2001.

Juretus et al., Reducing logic encryption overhead through gate level key insertion, in IEEE International Symposium on Circuits and Systems, pp. 1714-1717, 2016.

Koteshwara et al., Mode-based obfuscation using control-flow modifications, in Proceedings of the Third Workshop on Cryptography and Security in Computing Systems, ACM, pp. 19-24, 2016.

Koteshwara et al., Hierarchical functional obfuscation of integrated circuits using a mode-based approach, in IEEE International Symposium on Circuits and Systems, 6 pages, 2017.

Koushanfar, Provably secure active IC metering techniques for piracy avoidance and digital rights management, IEEE Transactions on Information Forensics and Security, vol. 7, No. 1 31 pages, 2012.

Lao et al., Obfuscating DSP circuits via high-level transformations, IEEE Transactions on Very Large Scale Integration Systems, vol. 23, No. 5, pp. 819-830, 2015.

Narasimhan et al., Hardware IP protection during evaluation using embedded sequential trojan, IEEE Design & Test of Computers, vol. 29, No. 3, pp. 70-79, 2012.

Parhi, Verifying equivalence of digital signal processing circuits, IEEE Signals, Systems and Computers, Conference Record of the Forty Sixth Asilomar, pp. 99-103, 2012.

Rajendran et al., Logic encryption: a fault analysis perspective, in Proceedings of the Conference on Design, Automation and Test in Europe, EDA Consortium, pp. 953-958, 2012.

Rostami et al., A primer on hardware security: models, methods, and metrics, Proceedings of the IEEE, vol. 102, No. 8, pp. 1283-1295, 2014.

Roy et al., EPIC: ending piracy of integrated circuits, in Proceedings of the conference on Design, automation and test in Europe, ACM, pp. 1069-1074, 2008.

Shanmugam, An obfuscated radix-2real FFT architecture, in IEEE International Conference on Acoustics, Speech, and Signal Processing, pp. 1056-1060, 2015.

Subramanyan et al., Reverse engineering digital circuits using functional analysis, in Proceedings of the Conference on Design, Automation and Test in Europe, EDA Consortium, pp. 1277-1280, 2013.

Subramanyan et al., Evaluating the security of logic encryption algorithms, in IEEE International Symposium on Hardware Oriented Security and Trust (HOST), pp. 236-241, 2016.

Villasenor et al., Chop shop electronics, IEEE Spectrum, vol. 50, No. 10, pp. 41-45, 2013.

(56) References Cited

OTHER PUBLICATIONS

Yasin et al., SARLock: SAT attack resistant logic locking, in IEEE International Symposium on Hardware Oriented Security and Trust (HOST), pp. 236-241, 2016.
Zhang et al., A PUF-FSM binding scheme for FPGA IP protection and pay-per-device licensing, IEEE Transactions on Information Forensics and Security, vol. 10, No. 6, pp. 1137-1150, 2015.
Zhang, A practical logic obfuscation technique for hardware security, IEEE Transactions on Very Large Scale Integration Systems, vol. 24, No. 3, pp. 1193-1197, 2016.

* cited by examiner

DYNAMIC FUNCTIONAL OBFUSCATION

BACKGROUND

Ensuring security of devices during design and manufacturing is of paramount importance in modern product life cycle management. With production of integrated circuit chips involving various companies located in different countries, this can quickly become a daunting task. Issues such as counterfeiting, unauthorized overproduction, piracy etc. have created a huge loss of revenue for semiconductor manufacturing companies. Also, threats such as reverse engineering and malicious circuit insertion have added to the burden of ensuring reliable and safe circuits. Adding encryption to a system by making use of secret keys and trying to keep its design and operation protected contribute to a countermeasure termed obfuscation.

SUMMARY

One embodiment is directed to an apparatus that includes a trigger generator and at least one multiplexer. The trigger generator is configured to generate a non-periodic trigger output. The at least one multiplexer is configured to output a valid control signal and an obfuscated control signal in response to a key value input. The obfuscated control signal is selectively set to one of a valid control signal and an invalid control signal based on the non-periodic trigger output.

Another embodiment is directed to a method, in which a non-periodic trigger output is generated using a trigger generator. An obfuscated control signal is set to one of a valid control signal and an invalid control signal based on the non-periodic trigger output. One of a valid control signal and the obfuscated control signal is output in response to a key value input, using a multiplexer. An apparatus is controlled based on the output from the multiplexer.

DETAILED DESCRIPTION OF ILLUSTRATIVE EMBODIMENTS INTRODUCTION

Figure 1:
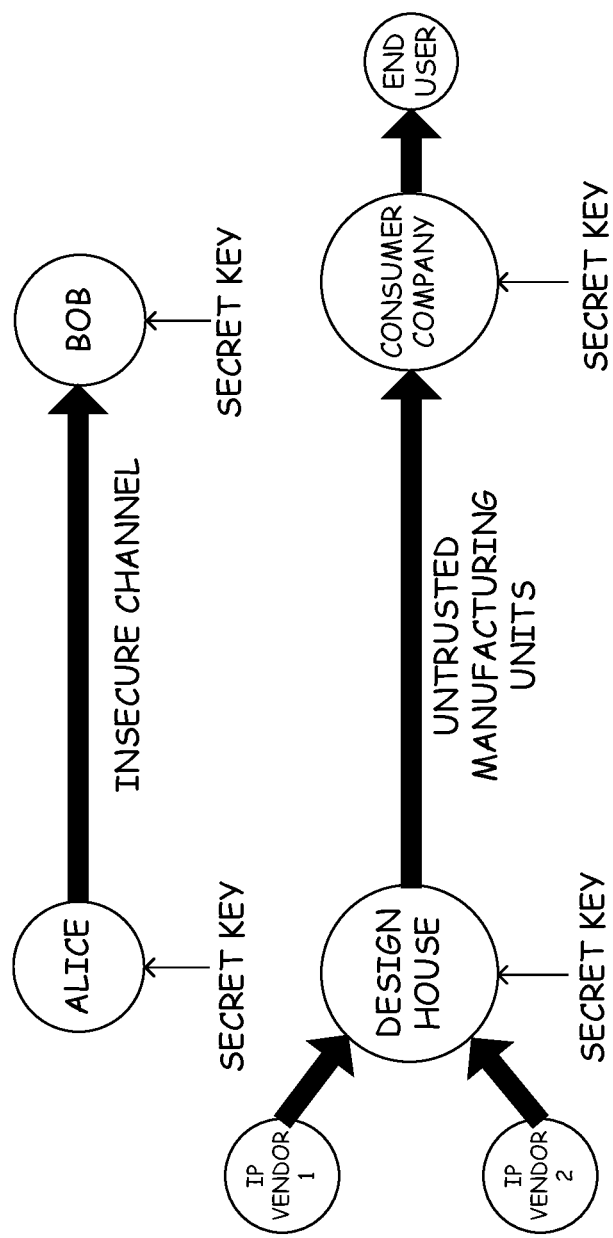
FIG. 1 is a comparison of an encryption scheme as defined in cryptography with hardware obfuscation technique for protection during manufacturing.

Embodiments of the present disclosure relate to providing security to hardware, such as an apparatus hardware in the form of a circuit, or an integrated circuit chip, for example, through functional obfuscation. Hardware obfuscation can be defined as trying to hide the functionality of a design and prevent black box usage by making use of secret keys. This obfuscation is similar to encryption due to the use of a key to lock the design. Encryption involves converting a plaintext into ciphertext using a secret key and passing it through untrusted channels. At the receiver end, the message is decrypted using the same secret key, such as illustrated by the exemplary communication between Alice and Bob illustrated in FIG. 1. Similarly, hardware obfuscation (e.g., fixed obfuscation) is performed for circuits using keys and the sender and receiver are assumed to be the trusted units of manufacturing. The design house creates the hardware that requires the secret key for it to perform a function, and the consumer company is supplied with the secret key (e.g., in flash memory) to enable the hardware to perform the function, as indicated in FIG. 1. Thus, the basic idea of functional obfuscation is to secure the hardware design using keys and prevent unauthorized usage of the hardware.

Current techniques of hardware obfuscation suffer from several shortcomings, leaving them vulnerable to attack. Furthermore, while some of the current methods are difficult to design and implement, others cause overheads in terms of area, power or by increasing timing requirements.

Embodiments of the present disclosure provide dynamic functional obfuscation for hardware. Unlike fixed obfuscation, in which an incorrect key always results in incorrect outputs by the circuit, the dynamic obfuscation provided by embodiments of the present disclosure causes the circuit to behave correctly or incorrectly in response to an invalid key. In some embodiments of dynamic obfuscation scheme, the datapath of the circuit remains intact, and the functional modes of the circuit are controlled by changing the control circuits only. This dynamic obfuscation provides several advantages over fixed obfuscation including stronger security and smaller key size requirements.

Fixed, Time-Varying and Dynamic Key-Based Obfuscation

In a multiplexer based hardware obfuscation, 2-input multiplexers are used to insert key bits into the design. The key bits are mapped to the select signals and correct and incorrect signals are mapped to inputs of the multiplexer. Embodiments of the present disclosure use the outputs of the multiplexers as control signals for the circuit. Therefore, the two inputs to the multiplexer, respectively, correspond to the correct and obfuscated control signals.

Figure 2:
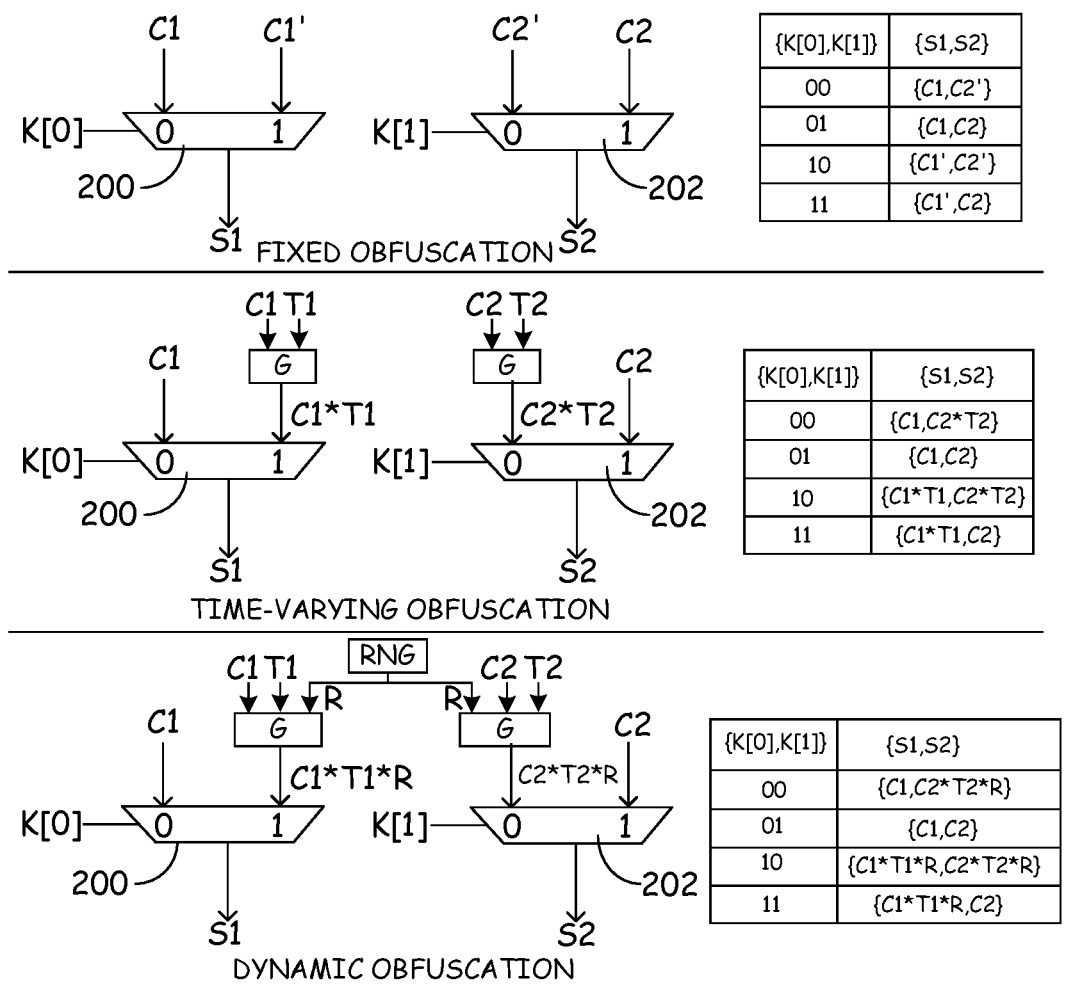
FIG. 2 shows simplified diagrams of obfuscation concepts including dynamic obfuscation, in accordance with embodiments of the present disclosure.

FIG. 2 is a simplified diagram illustrating the concepts of fixed obfuscation, time-varying obfuscation, and dynamic obfuscation, using a pair of input multiplexers 200 and 202. For example in FIG. 1, the correct signals to the multiplexers 200 and 202 respectively are C1 and C2, and the incorrect signals are C1' and C2' mapped to the two key gates 100 and 102 with select bits K[0] and K[1]. When K[0]=0 and K[1]=1, the correct signal combination is obtained at S1 and S2. For all other key bits, incorrect signals are selected. We term this method of obfuscation as fixed obfuscation.

In the time-varying obfuscation approach in accordance with embodiments of the present disclosure, the incorrect key values for K[0] and K[1] select the signals C1*T1 and C2*T2 at S1 and S2, respectively. T1 and T2 are termed trigger signals. The notation Ci*Ti represents an obfuscated signal that is derived using the correct control signal Ci and a trigger signal Ti, for i=1 and 2. The function G represents this combination.

In the dynamic obfuscation approach in accordance with embodiments of the present disclosure, a random number R generated by a random number generator is combined with the trigger signal to break its predictability. The notation Ci*Ti*R represents a signal that is a function of the control signal Ci, trigger signal Ti and the random number R. The approaches for fixed, time-varying and dynamic obfuscation will be described before discussing the details of generating triggers.

Typically, architectures are partitioned into datapath and controlpath to help facilitate the testing and optimization of circuit designs. The control-flow of the design decides its correct operation and this information is most critical to such systems. Embodiments of the present disclosure use this critical link in the design to introduce multiplexers controlled by key bits for obfuscation. Since the introduced key bits make the control-flow obscure to an attacker without access to the correct key, this design technique is referred to as mode-based control flow modification.

Figure 3:
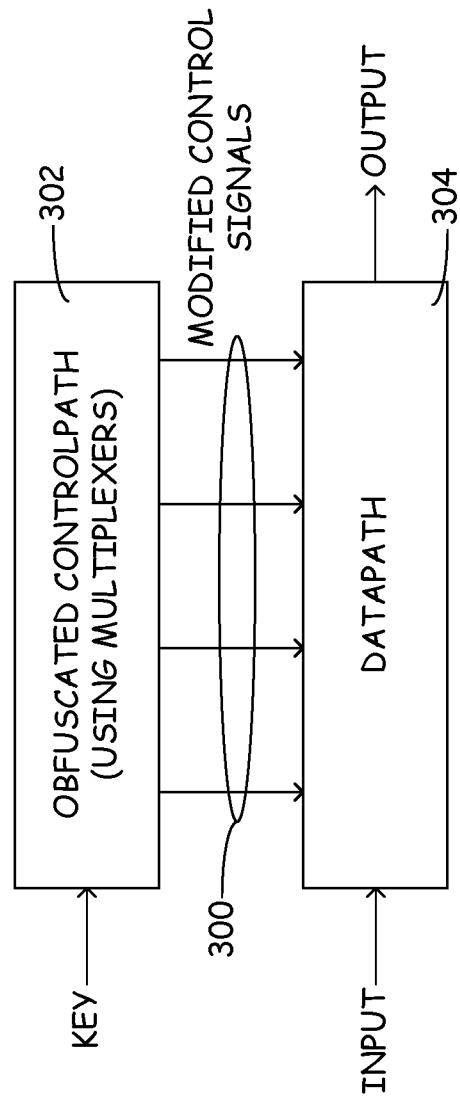
FIG. 3 is a block diagram providing a high level overview of mode-based obfuscation.

A top level overview of control flow modification is illustrated in the diagram of FIG. 3. The signals 300 generated by the controlpath 302 and received by the datapath 304 are derived from counters. Along with correct control sequences, incorrect control sequences are also derived using counter bits and the inverted counter bits. These together serve as the inputs to the multiplexers added for obfuscation. The select signals of the multiplexers are mapped to keys. In this design, the number of key bits that can be mapped depends on the number of control signals available for obfuscation and the size of multiplexers. For example, if there are 10 control signals available and if each of them is obscured using a 4-input multiplexer (with 2 bit select signal), then 20 key bits can be mapped.

Figure 4:
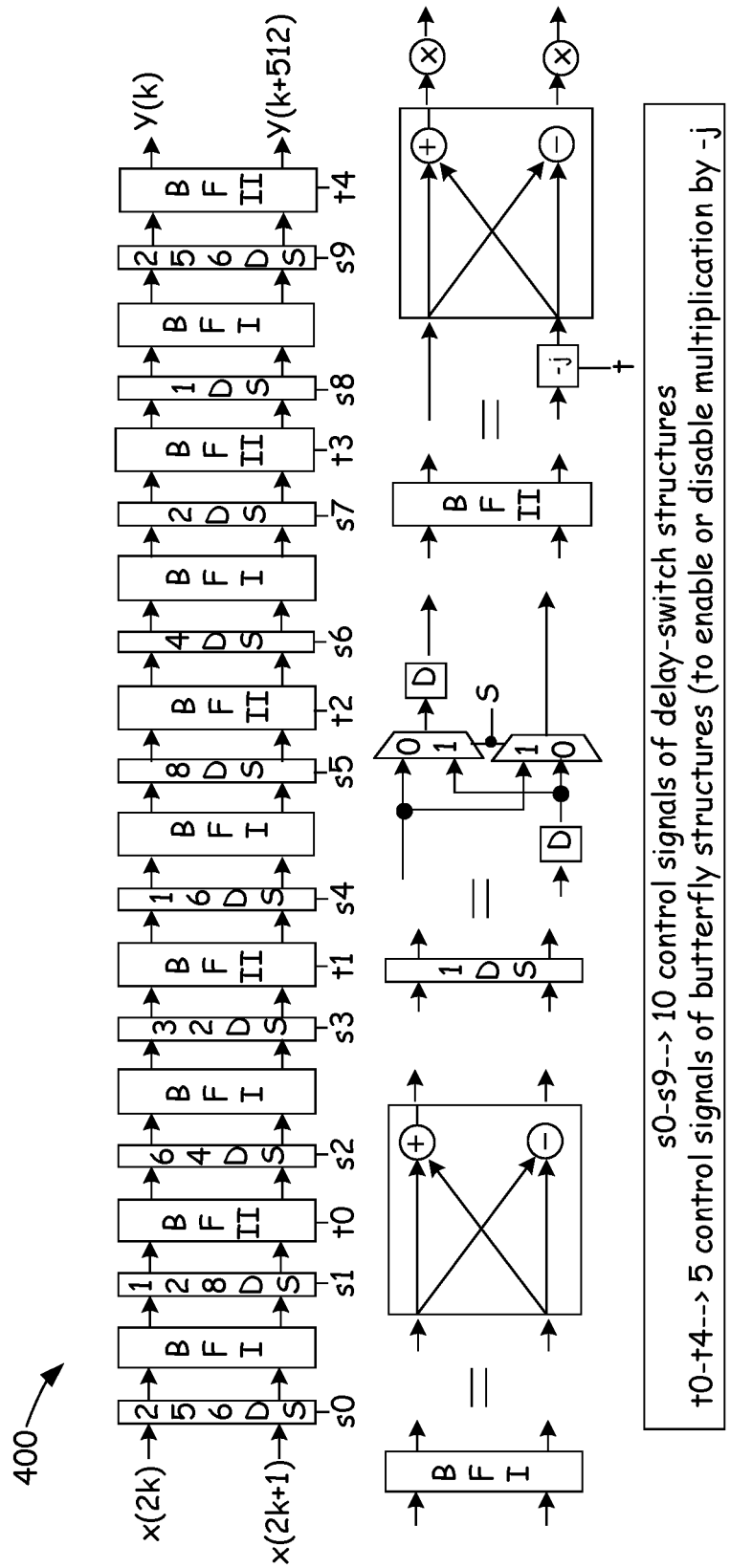
FIG. 4 is a diagram illustrating control-flow obfuscation including a datapath, components and control signals of a Folded, Radix-$2^2$ 1024-point FFT.

To explain control-flow obfuscation, we consider an example of a sequential circuit used to implement the fast Fourier transform (FFT) algorithm. Two other examples will be discussed below, when results of the proposed techniques are presented. The FFT architecture used for the example is a folded, radix-$2^2$ Decimation-in-Frequency (DIF) architecture. The 1024-point FFT circuit architecture 400 is depicted in FIG. 4 and shows the basic components of the design namely Butterfly units (BFI and BFII) and Delay-Switch units (DS). The control signals for the correct operation of this circuit include s0-s9 of the switches and t0-t4 of butterfly structures as depicted in FIG. 4. A 10-bit counter is used to derive the required control signals of the design. The 15 signals of the controlpath can be altered by inserting multiplexers as part of obfuscation to create modes.

Figure 5:
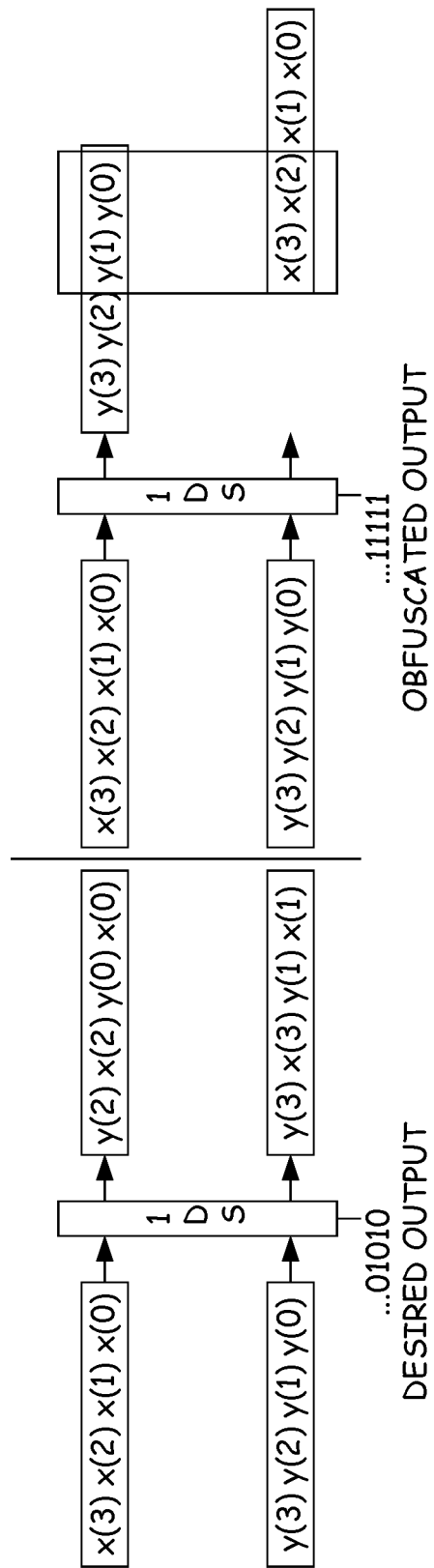
FIG. 5 illustrates incorrect outputs due to modification of control of switches.
Figure 6:
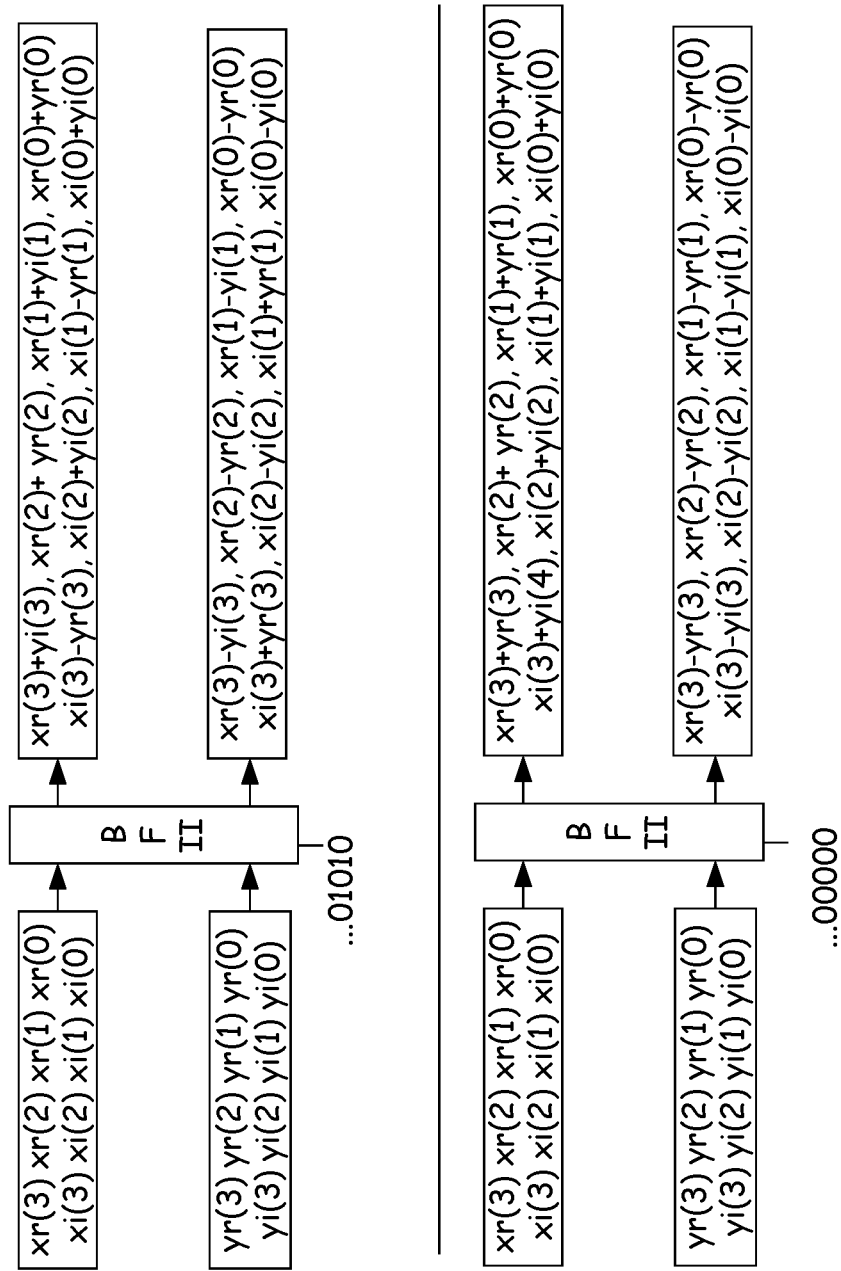
FIG. 6 illustrates a corruption of outputs of butterfly units.
Figure 7:
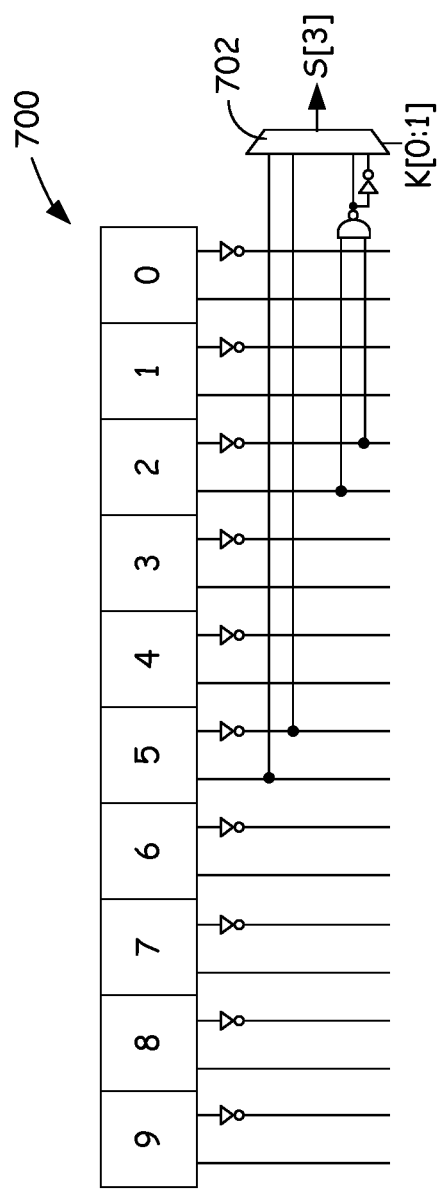
FIG. 7 illustrates a derivation of correct and modified control signals from a counter and mapping of key bits.

Modifications to the control signals described previously create modifications in the final output of the design. Specifically, the effect of changes to control of switches s0-s9 is shown in FIG. 5. For example, a change of the signal to all 1's or all 4's obfuscates the outputs of the delay-switch circuits. Similarly, the signals t0-t4 of butterflies can be modified to produce corrupt outputs as shown in FIG. 6. These observations suggest that each of these incorrect signals can serve as inputs to the key-gate multiplexers. For the 1024-point FFT shown in FIG. 4, the control signals and their modifications are derived from a 10-bit counter. An example of a control signal derived from the counter 700 and its various modifications mapped to a key-gate 702 are illustrated in FIG. 7. Since the correct key values to all multiplexers in the design result in correct operation, the system is said to operate in a meaningful mode for the correct key. For all other key values, computationally incorrect outputs are generated, resulting in the system operating in non-meaningful modes.

Figure 8:
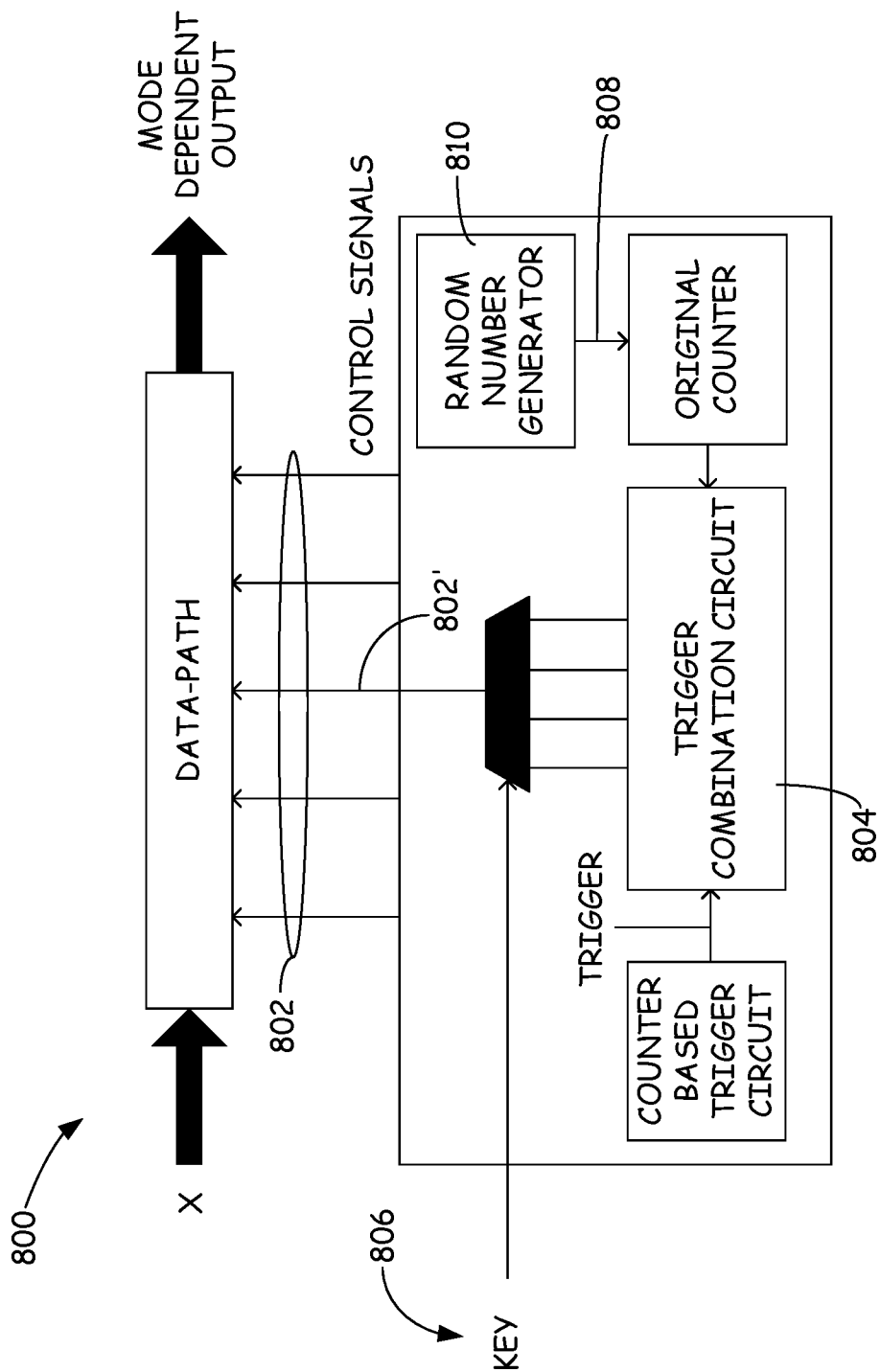
FIG. 8 is a trigger circuit combined with mode-based obfuscation to create time-varying and dynamic obfuscation, in accordance with embodiments of the present disclosure.

In some embodiments, trigger circuits are used to convert the fixed mode obfuscation into a dynamic one. It is to be noted that the trigger circuits may generate signals which trigger on rare conditions and in a periodic manner. Integrating the mode-based design with the trigger circuits is illustrated in the system 800 of FIG. 8. Instead of the modifications to control signals derived previously, here the control signals 802 are corrupted with the trigger signals using a trigger combination circuit 804. The corrupt and correct signals are then input to multiplexers. A multiplexer 802 connected to one of the control signals 802' is shown in FIG. 8 as an example.

The non-meaningful modes of the system now behave differently due to the presence of trigger circuits. When the trigger is on, outputs computed are incorrect. For the rest of the time, the system computes computationally correct outputs just like a meaningful mode. Hence, with each key value 806 input to the system 800, the system 800 behaves in a time-varying manner making the modes time-varying. Any attack involving the traversing of key space to decipher correct key values is made difficult by the fact that the behavior of the system is not constant. To increase the complexity of the system to an attack, randomness is introduced into the modes. In some embodiments, the output 808 of a random number generator 810 is input to the trigger generation circuit 804 to break the periodicity of the trigger signal. For every incorrect key value, instead of triggering at a fixed time duration, the trigger circuit is made to trigger at random. Thus, the modes become dynamic such that even if the same key value is input to the system, it behaves differently.

In some embodiments, for each of the incorrect dynamic modes, it is desired that the trigger occurs infrequently. Thus, in some embodiments, the trigger period of the trigger signal is large. Also, significant damage may be caused when the trigger is on, making the circuit unusable. Thus, the duty cycle of the trigger signal may be high. Furthermore, in some embodiments, the outputs (i.e., the obfuscated control signals) are frequently correct and less frequently incorrect, to make it more difficult to identify the incorrect mode or key. These factors are kept in mind while designing the trigger circuits. A second important consideration is the combination of the trigger circuits with the original circuit design. Modern reverse engineering attacks assume that structural inspection of circuits is possible. Thus, the trigger circuits need to be incorporated such that they evade detection and are not traceable from the primary inputs or outputs. Embodiments of the present disclosure make this possible by the careful design of trigger combination circuits.

Trigger Circuits and Trigger Combination Circuits

In some embodiments, the trigger circuits are configured activate on rare conditions and are difficult to detect. We start with a simple design considering a key size of 2 bits. The subsections then demonstrate how to extend the design for larger key sizes.

Hardware trojans are an emerging threat to modern day integrated circuits. Trojans constitute any malicious modification to hardware leading to altered functional behavior. These circuits are difficult to detect since they are small, have a stealthy behavior and get activated on conditions which are difficult to recreate while testing. Upon activation, trojans cause damage to the circuit by corrupting outputs or physically damaging its structure. The insertion of trojans leads to a large variety of structures and operating modes in the design. Also, unless the trojan circuits create a large difference in the power and timing of the original design, it is easy for them to escape detection.

Figure 9:
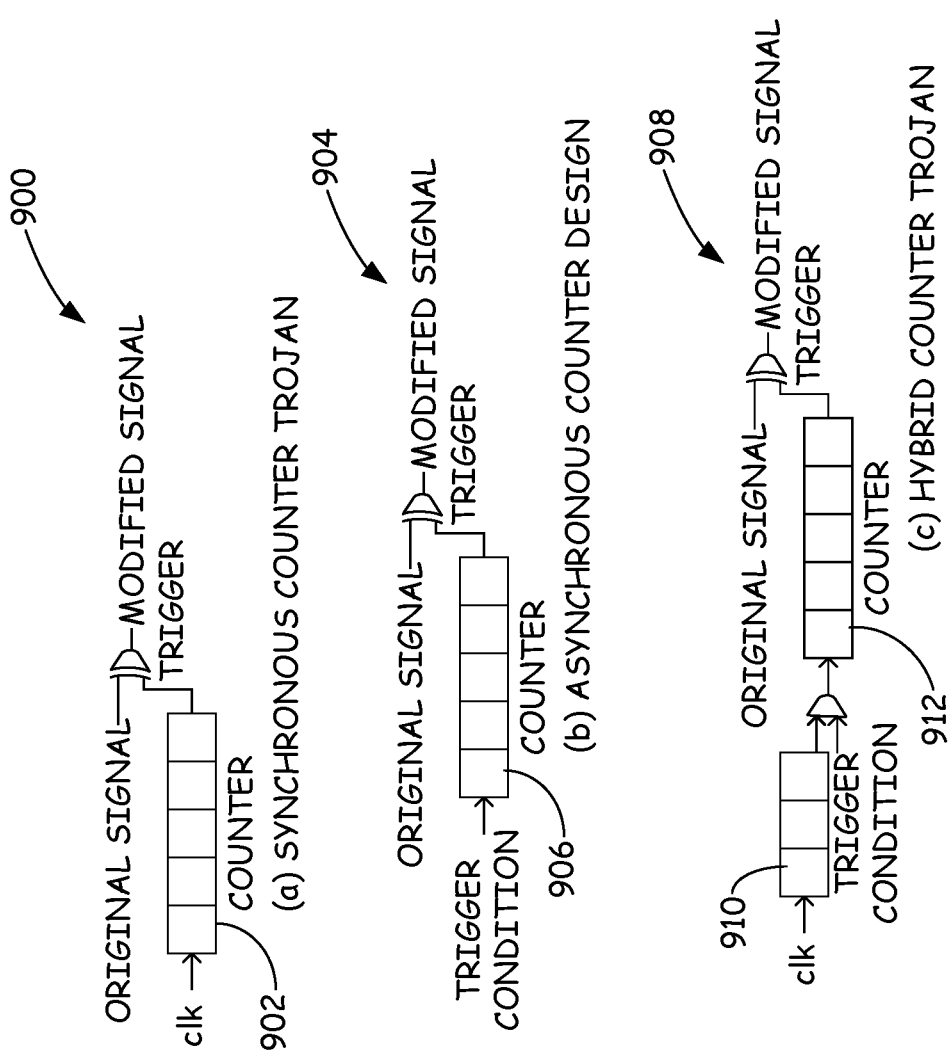
FIG. 9 illustrates different types of hardware trojan circuits.

There has been substantial research on the detection of hardware trojans and countermeasures that can protect against them. Efforts have been taken by various groups to understand and classify the different types of trojan circuits. One such trojan circuit is the sequential hardware trojan circuit, which can be synchronous, asynchronous or hybrid. Simplified circuit diagrams of these sequential trojans are shown in FIG. 9.

In a synchronous counter trojan, such as that shown at 900, the trigger occurs after the counter 902 reaches a pre-defined value. This is time based and hence termed "time-bomb" trojans. In an asynchronous counter trojan, such as that shown at 904, instead of incrementing the counter 906 for each clock cycle, the counter 906 increments based on internal trigger conditions. Finally, the concept of synchronous and asynchronous trojans can be combined to produce a hybrid circuit. This design, shown at 908, uses both clock based counters 910 and 912, and an asynchronous trigger condition to determine when the trojan activates. Once the activation occurs, the trigger modifies the original signal to behave differently from its original intent. Note that the hybrid trigger circuit should not be associated with the hybrid obfuscation approach presented herein.

Even though hardware trojans are malicious and dangerous for designs, a defender could use them for effective design obfuscation. As the defender is aware of the complete architecture of the circuit, in comparison to the attacker, it is easier for him/her to add trojan-like circuits in places difficult to detect. The circuits can then be used to control obfuscation of the design using keys. Trojan circuits that have been identified in literature are used to our advantage here.

Figure 10:
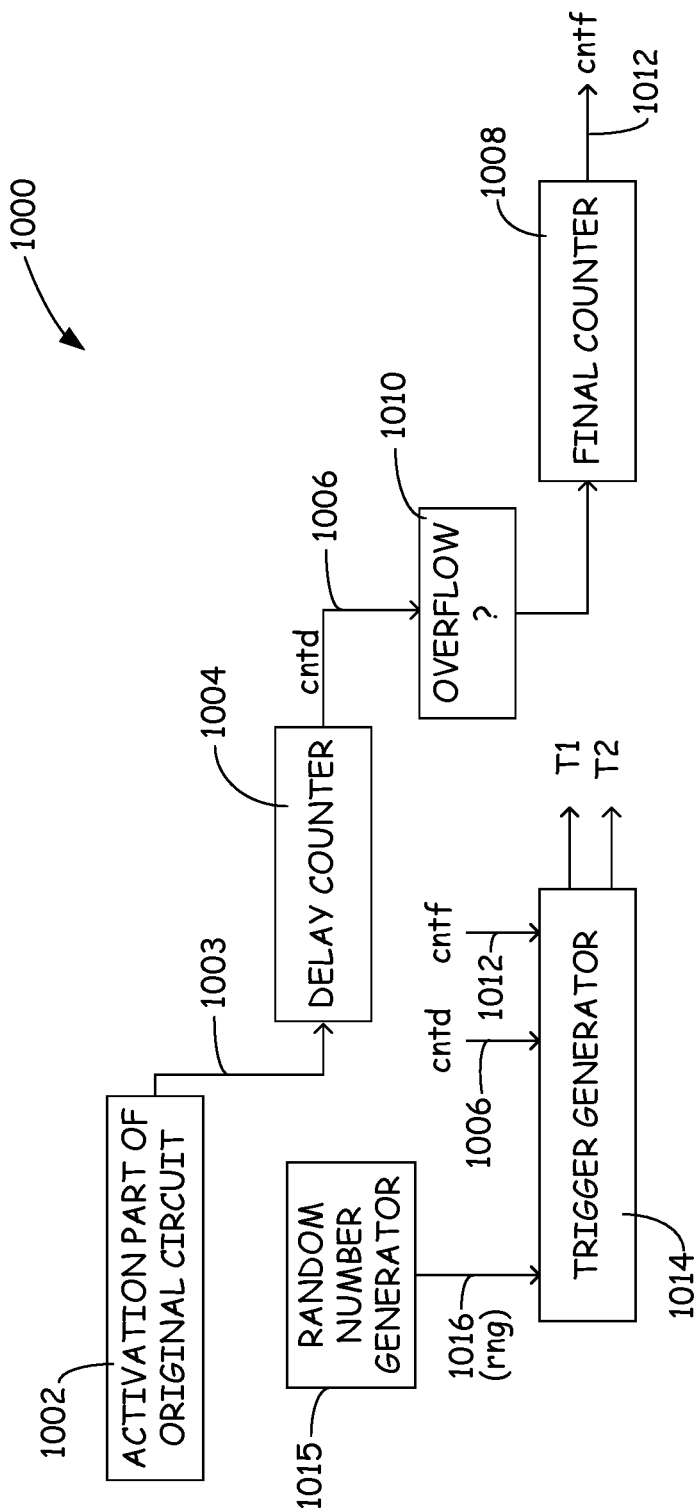
FIG. 10 is an exemplary sequential trigger generation circuit, in accordance with embodiments of the present disclosure.

For a key K of size 2 bits, a multiplexer based functional obfuscation would require two 2-input multiplexers and trigger signals T1 and T2 as was illustrated in FIG. 1. The design of a sequential trigger circuit 1000 for generating these trigger signals using counters is shown in FIG. 10. A part 1002 of the existing circuit is used for activation. The activation part 1002 could be purely combinational or a counter activating periodically. Let us assume that the activation circuit 1002 is activated with a period M, at which an activation signal 1003 is output. For example, M can be the number of clock cycles required for completing an N-Point FFT. Other values of M can be used in general.

The activation then triggers a delay counter 1004. The delay counter 1004 has an overflow output 1006 (cntd) and controls the delay after which a trigger would activate a final counter 1008. The final counter 1008 increments every time the delay counter 1004 overflows, as indicated at 1010. The output 1012 (cntf) of the counter 1008, and the output 1006 are input to a trigger generator circuit 1014. A random number generator 1015 generates a random number 1016 (rng), which is used as a third input to the trigger generator 1014. The trigger generator 1014 provides signals T1 and T2.

The generated signals T1 and T2 depend on the trigger condition of the trigger generator 1014. For example consider the following condition:

If ($cntf==rng$ and $cntd==0$)→$T1=1$, else $T1=0$

Figure 11:
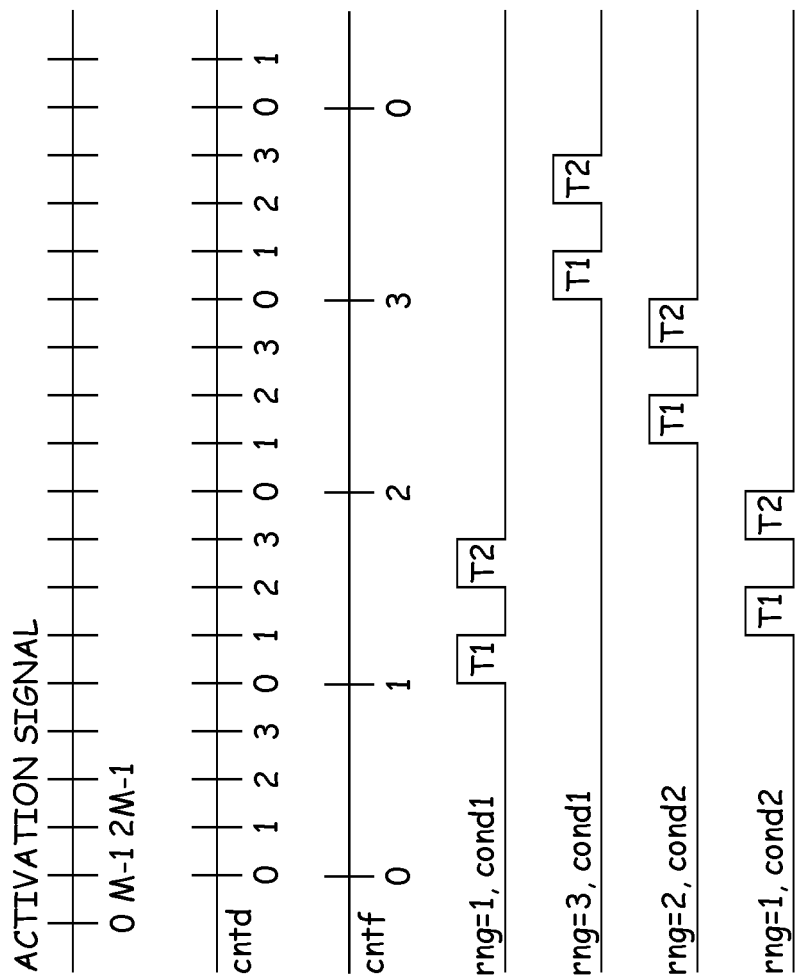
FIG. 11 is a timing diagram of trigger signals used in the trigger generation circuit of FIG. 10 for exemplary conditions.

If ($cntf==rng$ and $cntd==2$)→$T2=1$, else $T2=0$  Condition 1:

For the exemplary key size of 2 bits, we select the counter sizes of delay counter 1004, final counter 1008, and size of random number generator input 1016 to be 2 bits. Using these values, trigger times for T1 and T2 based on Condition 1 and different values of the random input 1016 (rng) are shown in FIG. 11. Another condition which could be used is as follows:

If ($cntf==rng$ and $cntd==1$)→$T1=1$, else $T1=0$

If ($cntf==rng$ and $cntd==3$)→$T2=1$, else $T2=0$  Condition 2:

The trigger signals for Condition 2 are also shown in FIG. 11.

The size of delay counter 1004 is chosen to be equal to the number of trigger signals required. This ensures that when multiple trigger signals are selected by a single key value, the effect of each trigger is observed at the outputs. The number of trigger signals required equals the number of key bits mapped (one trigger signal for each 2:1 multiplexer). Therefore, size_cntd=$\log_2$ (K). To ensure minimal overlap between triggers selected by multiple key values, the size of the final counter 1008 can be chosen to be equal to the key size. Hence, size_cntf=K. However, the size of the output cntd can be lowered resulting in a different configuration of trigger generation as discussed below. To enable the trigger signal to fire at random, the number of states of the random number generator is selected as equal to the final counter 1008.

The design of trigger circuits using sequential logic results in periodic signal outputs. The trigger period of these signals determines how often the corruption in output occurs. To avoid detection, this period is preferably very long. The calculation of trigger period is given by Equation (1).

$$\text{trig\_period}=M \times 2^{size\_cntd} \times 2^{size\_cntf}=MK2^K \quad (1)$$

Since the trigger condition is dependent on the random number generator, the trigger can occur anywhere between the values 0 to $2^{size\_cnf}-1$.

The duty cycle of the trigger period determines how long the trigger is active. In some embodiments, the duty cycle should is sufficient to create enough damage to the circuit to make it inoperable. The duty cycle is calculated as the ratio of the on period of the trigger signal to its total period. Since the trigger is dependent on cntd, the trigger signal is on for one full increment of the delay counter, which happens every M cycles. The duty cycle is thus given by Equation (2).

$$\text{duty\_cycle} = \frac{M}{\text{trig\_period}} = \frac{1}{(K2^K)} \quad (2)$$

Finally, the percentage of incorrect outputs for each key depends on the number of trigger signals used. This number in turn depends on the mapping of multiplexers to key bits. For the 2-bit key example shown in FIG. 2, key values 00 and 11 use only one signal T1 and T2, respectively. Key value 10 uses both signals T1 and T2. Hence, the time duration for which corrupt outputs are produced is longer for this key value. This is given by Equation (3).

$$\text{percentage}=\text{duty\_cycle} \times \text{trig\_signals\_per\_key} \times 100 \quad (3)$$

The average percentage of incorrect signals for all incorrect keys is given by Equation (4). The summation term in this equation indicates the total number of trigger signals selected by all incorrect keys.

$$\text{average\_percentage} = \frac{\frac{1}{(K2^K)}\sum_{n=1}^{K} n \binom{K}{n}}{2^K} 100 = \frac{100}{2^{K+1}} \quad (4)$$

From the key mapping shown in FIG. 1, key 00 selects one trigger combined signal while key 10 selects two trigger combined signals. Using this mapping, for the counter circuit illustrated in FIG. 10, if M=100, size_cntd=2 and size_cntf=2 are selected, the trigger period, duty cycle and percentage of incorrect outputs are as follows.

trig_period=100×2²×2²=1600 cycles duty_cycle=100/1600=1/16 percentage_key00=1/16×1×100=6.25% percentage_key10=1/16×2×100=12.5%

4) Extension to Key Size>2 Bits

The techniques to design trigger circuits, as described for key size of 2 bits, can be easily extended to larger key sizes. For the delay counter 1004, we choose its size such that its maximum value equals the number of trigger signals required. For example, key_size=4 requires 4 trigger signals. Hence, size_cntd=2 will suffice. For the final counter 1008, we select its size such that it is equal to the key size. For this example, key_size=4 and size_cntf=4. The trigger period and duty cycle are then calculated. The percentage of incorrect outputs is calculated as an average over the entire key space. This is documented in detail for key sizes starting from 2 bits up to 32 bits in Table I. We see that the trigger period quickly reaches high values with the increase in key size. However, the duty cycle also reduces to smaller values.

TABLE I

Trigger Period, Duty Cycle and Percentage Incorrect Outputs for Different Key sizes and M = 100

| Key size | Counter size {size_cntd, size_cntf} | Trigger condition dependence | Trigger period (cycles) | Duty cycle | Average percentage of incorrect outputs |
|---|---|---|---|---|---|
| 2 | 1, 2 | cntd, cntf | 800 | 1/(8) | 12.5% |
| 4 | 2, 4 | cntd, cntf | 6400 | 1/(64) | 3.125% |
| 8 | 3, 8 | cntd, cntf | 204,800 | 1/(2048) | 0.1953% |
| 16 | 4, 16 | cntd, cntf | 104,857,600 | 1/(1,048,576) | 0.00076% |
| 32 | 5, 32 | cntd, cntf | $1.37 \times 10^{13}$ | $1/(1.37 \times 10^{11})$ | $1.164 \times 10^{-8}$% |

To overcome this problem, some embodiments reduce the size of the final counter 908 to half its value and include an additional delay counter with size_cntd2=size_cntf=K/2 bits. The trigger period, duty cycle and average percentage of outputs are now given by Equations (5), (6) and (7).

$$\text{trig\_period} = M2^{\frac{K}{2}} K 2^{\frac{K}{2}} = MK2^K \tag{5}$$

$$\text{duty\_cycle} = \frac{1}{K2^{\frac{K}{2}}} \tag{6}$$

$$\text{average\_percentage} = \frac{100}{2^{\frac{K}{2}+1}} \tag{7}$$

We observe that there is an improvement in the duty cycle and average percentage of incorrect outputs while maintaining the same trigger period as shown in Table II. Note that the equations and calculations hold for any circuit in which dynamic obfuscation is employed. The trigger period has a direct dependence on the value of M, which can be designed in a way to make the trigger period as high as possible. However, the equations of duty cycle and percentage of incorrect outputs are independent of M.

TABLE II

Increased Duty Cycle and Percentage of Incorrect Outputs for Same Trigger Period as Table I and M = 100

| Key size | Counter size {size_cntd1, size_cntd2, size_cntf} | Trigger condition dependence | Trigger period (cycles) | Duty cycle | Average percentage of incorrect outputs |
|---|---|---|---|---|---|
| 2 | 1, 1, 1 | cntd2, cntf | 800 | 1/(4) | 25% |
| 4 | 2, 2, 2 | cntd2, cntf | 6400 | 1/(16) | 12.5% |
| 8 | 4, 3, 4 | cntd2, cntf | 204,800 | 1/(128) | 3.125% |
| 16 | 8, 4, 8 | cntd2, cntf | 10,497,600 | 1/(4096) | 0.1953% |
| 32 | 16, 5, 16 | cntd2, cntf | $1.37 \times 10^{13}$ | 1/(2,097,152) | 0.00076% |

Trigger combination circuits serve as the link between original control signals and the inputs of the multiplexers inserted as part of obfuscation. Embodiments of these circuits satisfy the one or more following design requirements.

Even if the key-gate multiplexers are recognized during inspection of netlist, the trigger combination circuits are substantially indistinguishable from the original circuit making them difficult to detect and remove.

The logic of the trigger combination circuit have sufficient randomness and permutations to substantially avoid traceability. This means that an attacker should not be able to trace from the key input up to the counter output successfully.

The correct and incorrect signals need to be obfuscated similarly so these cannot be differentiated structurally.

Figure 12:
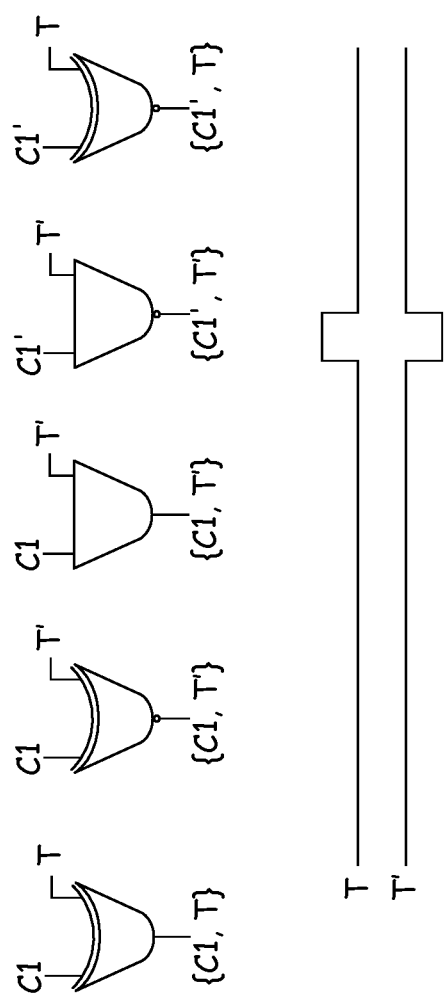
FIG. 12 illustrates logic gates of the trigger combination circuit to combine the generated trigger signals with existing control signals, in accordance with embodiments of the present disclosure.

With these design goals in mind, a combination of exemplary circuits are created using simple elements. Examples of fusion of control signals and trigger signals using different gates are shown in FIG. 12. In this figure, C1 is the original control signal and C1' is its complement. Two versions of the trigger signal can be used: T and T'. All of the exemplary gate combinations shown can successfully combine the trigger and original signals of the design.

Figure 13:
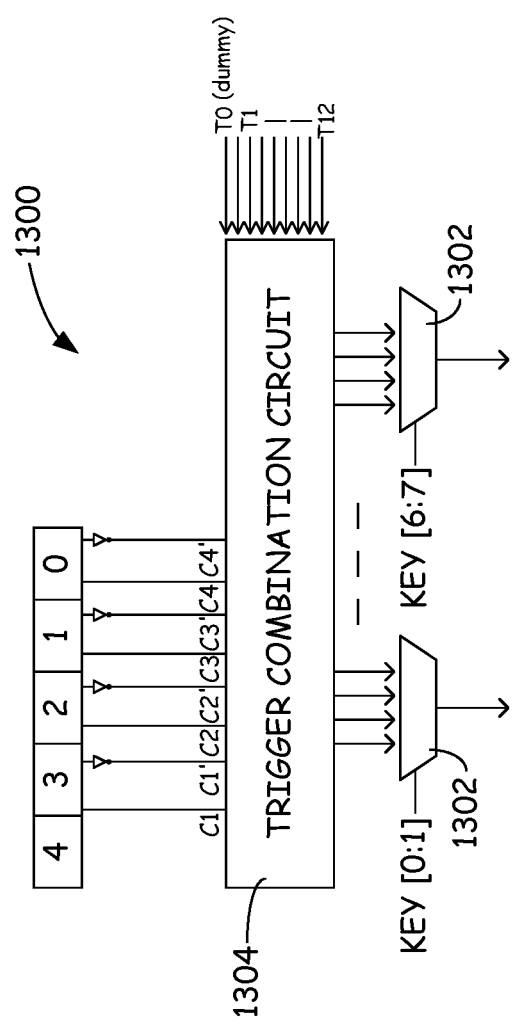
FIG. 13 is a trigger combination circuit added between derived control signals and the key-bit mapped multiplexers for a key size=8 bits, in accordance with embodiments of the present disclosure.

An exemplary trigger combination circuit 1300 composed of logic gates is integrated into the controlpath of the mode based design is shown in FIG. 13. In this example, the key size is 8 bits and four 4-input multiplexers 1202 are required. Each multiplexer 1302 requires one correct signal and three incorrect signals. A total of 12 trigger signals and 1 dummy signal are input to the trigger combination circuit 1304. The dummy signal is used to make a dummy combination of the correct control signal with the trigger signal. The dummy signal may be all-1 or all-0 signal, for example. This makes the correct control signal structurally similar to all other control signals.

The trigger combination circuit is a key aspect of the security of the design. In some embodiments, complexity is introduced into this block by using more logic gates and more levels between the control signals and multiplexer inputs. This basically creates a layer of permutation between the counter outputs and the multiplexer.

Extension to Hybrid Obfuscation Schemes

The dynamic obfuscation scheme generates correct outputs for all keys (i.e., valid and invalid) for a majority of operation time of the circuit. The corruption in circuits preferably occurs for short periods of operation of the system. For some applications, this may not be desirable and traditional obfuscation may be required in terms of obtaining incorrect outputs for incorrect keys for all samples. A combination of the fixed and dynamic obfuscation schemes, termed hybrid obfuscation, indicates two-level obfuscation using both fixed and dynamic ideas and is not to be confused with the hybrid hardware trojans discussed earlier. The hybrid obfuscation scheme combines a higher security property of dynamic obfuscation in terms of time complexity and resistance against attacks with the generation of incorrect outputs for incorrect keys concept of fixed mode obfuscation.

Figure 14:
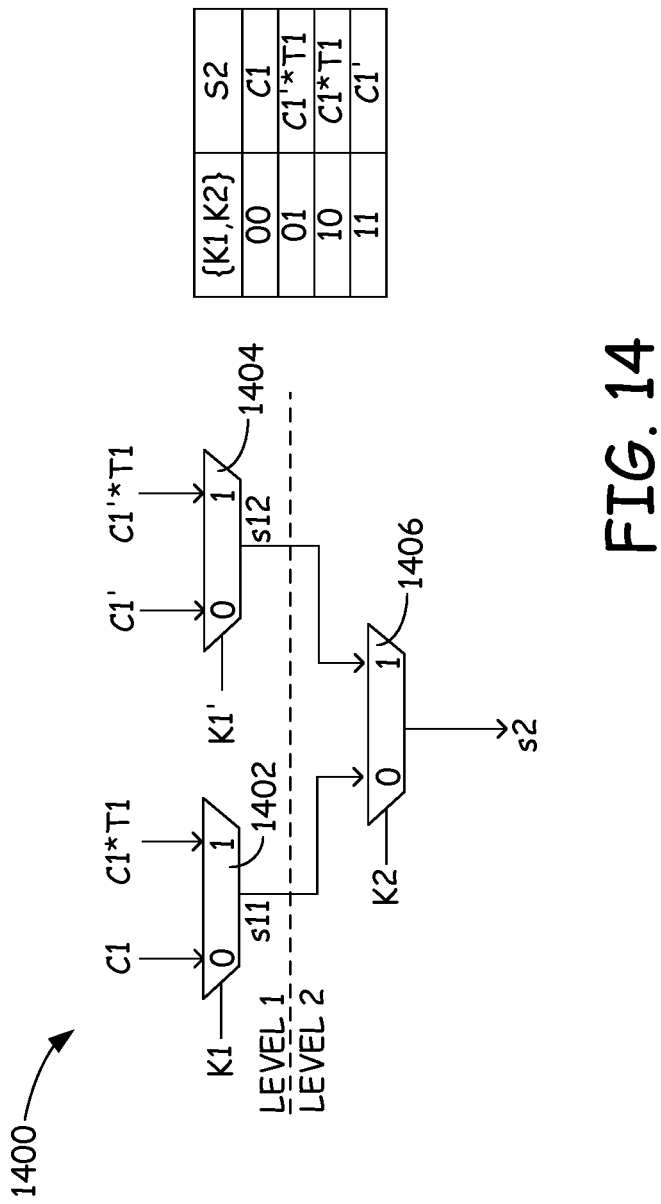
FIG. 14 is a basic structure for hybrid obfuscation using multiplexers at two levels, in accordance with embodiments of the present disclosure.

FIG. 14 shows an exemplary basic circuit structure 1400 of the hybrid obfuscation technique using multiplexers 1402, 1404 and 1406. 2 key bits are mapped to each structure. Key bit K1 at level 1 obfuscates the signal C1 and its complement C1' using trigger based dynamic obfuscation. At level 2, signals s11 or s12 are selected based on K2 obfuscated using fixed mode obfuscation. The final selected signal is s2. For this example, the circuit 1400 works correctly for key value 00, dynamically for key value 11 and incorrectly for key values 01 and 10. These structures can replace the simple multiplexers used in the dynamic obfuscation scheme. For each signal, two key bits get mapped. Hence a 4-input multiplexer can be directly replaced by the basic structure of hybrid obfuscation. The design of trigger circuits for the dynamic obfuscation part of the hybrid obfuscation is the same as discussed earlier.

However, only half of the key bits are mapped using dynamic obfuscation. Hence, the equations derived earlier for trigger period, duty cycle and average percentage of incorrect outputs can be reused but with a key size equal to K/2. The advantages of this technique both with respect to security and overheads are discussed below.

Security Analysis

In a typical attack model for analyzing security of obfuscation schemes, it is assumed that the attacker has access to the obfuscated netlist which could be obtained by reverse engineering. It is also assumed that a functional IC with a correct working configuration and I/O pairs are available. The netlist provides information about the structure of the design and internal signal values while the functional IC provides correct I/O pairs. The additional components of the design including trigger circuit and trigger combination circuit are designed such that they are substantially indistinguishable from the original circuit components. With these assumptions in mind we consider possible attacks and the security level of obfuscation as described in the next subsections.

A brute-force attack is an attempt to decipher the correct key of a design by traversing the key space and validating using the primary inputs and outputs of the system. Here we consider that an attacker uses a set of correct I/O patterns and inputs different key values. When the key value is correct for all the I/O pairs, the correct key is discovered. The time for brute-force attack is given by Equation (8), where K is the key size, t is the clock period of operation of original circuit and T is the trigger period of obfuscation.

$$\text{time\_brute\_force\_attack} = 2^{K-1} tT \tag{8}$$

Using the equations for trigger period provided in Equation (1), configurations provided in Table I and different values of M, we tabulate values for the time to attack in Table III. We assume a system operating at a frequency of 100 MHz, i.e., a clock period of 10 ns. This table also provides effective key size values which indicate the key size that would be needed if a fixed obfuscation technique using multiplexers were used. This value is calculated using $\log_2(\text{time\_brute\_force\_attack}/t)$. We observe that the effective key size is more than double of that of the actual key size. We also observe that as the value of M increases, the effective key size for the same trigger circuits and key size increases. This indicates the importance of choosing a rare event to increase the trigger period of the trigger signal.

TABLE III

Brute-Force Attack Time for Different Key Values, Trigger Period and M with System Operating at 100 MHz

| Key size | M | Trigger period (cycles) | Time brute force attack | Effective key size |
|---|---|---|---|---|
| 2 | 100 | 800 | $16 \times 10^{-3}$ ms | 11 |
| 4 | 100 | 6400 | 0.512 ms | 16 |
| 8 | 100 | 204,800 | 0.2621 s | 25 |
| 16 | 100 | 104,857,600 | 9.54 hrs | 42 |
| 24 | 100 | 53,687,091,200 | 142.80 yrs | 59 |
| 32 | 100 | $1.37 \times 10^{13}$ | 9,329,187 yrs | 75 |
| 2 | 1000 | 8000 | $16 \times 10^{-2}$ ms | 13 |

TABLE III-continued

Brute-Force Attack Time for Different Key Values, Trigger Period and M with System Operating at 100 MHz

| Key size | M | Trigger period (cycles) | Time brute force attack | Effective key size |
|---|---|---|---|---|
| 4 | 1000 | 64,000 | 5.12 ms | 19 |
| 8 | 1000 | 2,048,000 | 2.621 s | 28 |
| 16 | 1000 | 1,048,576,000 | 3.97 days | 45 |
| 24 | 1000 | 536,870,912,000 | 1428 yrs | 62 |
| 32 | 1000 | $1.37 \times 10^{14}$ | 93,291,875 yrs | 78 |

In a reverse engineering attack, it may be assumed that information available from the netlist of the design and intermediate signal tapping can also be used is used to decipher the key. For example, in the case of a sequential circuit like FFT, if the control signals used for modification and multiplexer insertion are assumed to be known, a reverse engineering attack could be carried out. When an attacker tries to trace the key inputs of the design, it leads him/her to the key gates which are multiplexers in this case. The attack now reduces to finding correct select signals to obtain correct values at the outputs of the multiplexers.

For each multiplexer, one of the inputs is correct for the complete duration of operation of the circuit while the others have incorrect outputs for a short period of time. Thus, an attacker has to simulate the gate with inputs and different select signals and wait for a duration equal to the trigger period of the circuit. Repeating this process for all key-gates of the design results in time to attack as given by Equation (9). In this equation, the divide by 2 represents an average time between 0 and maximum value.

$$\text{time\_to\_attack} = \text{num\_muxes} \times \frac{\text{size\_of\_mux}}{2} \times T \quad (9)$$

We observe that this value depends on the trigger period of the circuit, number of multiplexers inserted and the average size of the multiplexer. By choosing high values for M, size_cntd and size_cntf, we can ensure a longer trigger period and thus a longer time to attack. We use the same equations and configurations as done for the brute-force attack and tabulate our observations in Table IV. We observe that the time complexity of attack and effective key size are still large compared to the actual size of key inserted. This indicates that even though the time complexity decreases with respect to a brute-force attack, it is still a high value. Moreover, even though reverse engineering is a powerful attack, the assumptions involved may not be practical unless an attacker is equipped with expensive resources required for observation and measurement.

TABLE IV

Time Complexity of Reverse Engineering Attack at Multiplexers for Different Key Sizes and Values of M

| Key size | No. of Multiplexers | M | Trigger period (cycles) | Time to attack (cycles) | Eff. key |
|---|---|---|---|---|---|
| 2 | 2 2:1 | 100 | 800 | 1600 | 11 |
| 2 | 2 2:1 | 10000 | 80,000 | 160,000 | 17 |
| 4 | 4 2:1 | 100 | 6400 | 25,600 | 15 |
| 4 | 4 2:1 | 10000 | 640,000 | 2,560,000 | 21 |
| 8 | 8 2:1 | 100 | 204,800 | 1,638,400 | 21 |
| 8 | 8 2:1 | 10000 | 20,480,000 | 163,840,000 | 27 |
| 16 | 8 4:1 | 100 | 104,857,600 | 1,677,721,600 | 31 |
| 16 | 8 4:1 | 10000 | 10,485,760,000 | 167,772,160,000 | 37 |
| 24 | 12 4:1 | 100 | 53,687,091,200 | $1.28 \times 10^{12}$ | 40 |
| 24 | 12 4:1 | 10000 | $5.36 \times 10^{12}$ | $1.28 \times 10^{12}$ | 47 |
| 32 | 16 4:1 | 100 | $1.37 \times 10^{13}$ | $4.38 \times 10^{14}$ | 49 |
| 32 | 16 4:1 | 10000 | $1.37 \times 10^{14}$ | $4.38 \times 10^{16}$ | 55 |

C. Boolean Satisfiability (SAT) Solver Based Attacks

For a Boolean Satisfiability (SAT) solver based attack, two assumptions are made. First, a small set of correct input/output patterns is available from a functional IC. Second, the encrypted gate-level netlist is available and fed as input to the solver tool. The SAT solver then attempts to solve for the correct key using multiple iterations. In every iteration, a set of distinguishing input patterns are used. Based on the output generated, the key value is determined as correct or incorrect. However, instead of eliminating just one key value, a set of key values termed the equivalence class of keys is eliminated. Instead of the attack having an exponential complexity, as in brute-force attacks, the SAT solver based attack has linear time complexity. This effectively reduces the security of the design and its key size.

For embodiments of the present disclosure, the basic assumption used in SAT solvers does not hold. For all keys input into the system, the circuit operates correctly for most of the time duration of the circuit. Hence, to be able to get distinguishing input and output patterns with respect to each of the key values, we need to be operating the system when it produces incorrect outputs. Since this rarely occurs (dependent on the activation rate and trigger period), such an attack is not valid in the case of dynamic obfuscation design. A similar argument can be used for sequential circuits where formal verification tools such as model checkers are used.

For the hybrid obfuscation scheme (FIG. 14) in accordance with embodiments of the present disclosure, brute-force attack time can be calculated using Equation (10) where we assume K1=K2=K/2. In this equation, the first term of the sum represents time of brute force attack for the modes which are dynamically obfuscated and the second term of the sum represents modes which are fixed.

$$time_{brute\,force_{attack}} = \frac{2^{\frac{K}{2}}tT + \left(2^K - 2^{\frac{K}{2}}\right)t}{2} \quad (10)$$

An attack using information obtained from reverse engineering can be targeted at two levels. First, an attacker can attempt to decipher the correct key K2 at level 2. This is the attack time of a fixed obfuscation scheme and is exponential in the number of key bits of K2 for the complete design. Once the correct key bit is figured out, either s11 or s12, is known to be the correct signal. Hence, an attacker proceeds to deciphering the key at level 1, K1, to understand which of the signals gives correct outputs for 100% of operation time of design. The time of attack for key at level 1 is given by Equation (9). These computations result in values tabulated in Table V. We observe that the hybrid obfuscation is not as strong as the dynamic obfuscation but offers two levels of security. One level of security is due to the dynamic obfuscation and the other is due to the fixed mode of obfuscation.

TABLE V

Time to Attack Using Brute-Force Technique and Reverse Engineering for a System Using Hybrid Obfuscation Scheme Operating at a Frequency of 100 MHz

| Key size {K1, K2} | M | Brute force attack | Effective key size | Rev Eng. Attack (cycles) | Effective key size |
|---|---|---|---|---|---|
| 8 {4, 4} | 1024 | 5 ms | 19 | 524,320 | 19 |
| 16 {8, 8} | 1024 | 2.68 s | 28 | 33,554,944 | 25 |
| 30 {15, 15} | 1024 | 22.90 hrs | 42 | $1.61 \times 10^{10}$ | 35 |

Results

There are two sources of overhead associated with the proposed obfuscation techniques. First, there is the overhead due to counter based trigger circuits. Second, there is the overhead due to trigger combination circuits and the use of multiplexers for mapping of key bits. For the second overhead analysis, the discussed FFT example was used, and overheads are determined with respect to its unobfuscated implementation. Two other examples from the high level modules of ISCAS'89 benchmarks (ISCAS High-Level Models) and OpenCores platform (Ethernet MAC 10/100 Mbps) were also considered. The implementations were targeted towards ASIC design and Cadence technology library of 65 nM is used. We use Verilog HDL for modeling and Synopsys Design Compiler for synthesis. The designs were clocked at a frequency of 100 MHz. Area, Power and Timing of the designs as reported by the tool are tabulated. Gate counts were calculated using the Equation (11).

$$Gate\_count = Area\_of\_design/Area\_of\_NAND\_cell \quad (11)$$

For the area and power requirements of the trigger circuits based on counter design, configurations as suggested in Table I were used, and key values in the range of 2 bits to 32 bits were considered. Tabulations of the area, gate count, power and timing are shown in Table VI. We observed that the counter circuits did not add significantly to both area and power overheads of the design. For most medium sized architectures, these counter based trigger circuits could be inserted without varying the budget constraints of the device significantly. The low area and power also indicate that it is easy to maintain the stealthiness of these circuits.

TABLE VI

Gate Counts of Counter Based Trigger Circuits for Different Key Sizes

| Key size | Counter sizes {cntd, cntf} | Area (um^2) | Gate count | Power (uW) | Timing (ns) |
|---|---|---|---|---|---|
| 2 | {1, 2} | 89.96 | 43 | 4.32 | 0.87 |
| 4 | {2, 4} | 196.23 | 94 | 7.12 | 1.06 |
| 8 | {3, 8} | 352.77 | 169 | 10.50 | 1.34 |
| 16 | {4, 16} | 644.61 | 309 | 16.54 | 2.78 |
| 32 | {5, 32} | 1221.48 | 587 | 28.22 | 3.48 |

A comparison was made between the overhead of sequentially-triggered mode-based obfuscation to that of the fixed-mode obfuscation. For obfuscation, trigger based counter circuits were added to a 1024-point FFT circuit using the configurations from Table I. The 10-bit counter used in the controlpath was used for activation of the trigger circuit. The periodicity of this counter which is equal to $2^{10}$ is the activation rate M. Keys of size 2, 4, 8, 16 and 30 bits were used using the 15 control signals indicated previously. Either 2:1 multiplexer or 4:1 multiplexer was used depending on the number of key bits to be mapped. For example, a 2 bit key requires two 2-input multiplexers added to two control signals and two trigger signals. On the other hand, a 16 bit key can be added to the design by obfuscating 8 control signals with 4-input multiplexers.

For the fixed obfuscation scheme, the design was obfuscated using the same 15 control signals as in dynamic obfuscation. The two schemes were implemented using the same combination of key sizes and multiplexer sizes and compared in Table VII. The table also presents the difference in security level in terms of time to attack. We observed that the time to attack for a key size of 30 bits is approximately $1.88 \times 10^{22}$ cycles (5,961,440 years).

A fixed obfuscation scheme of the same key size would be broken in just 536,870,912 cycles (5.36 s). The increase in security using a smaller key and resistance to other forms of attack come at a slightly higher cost with respect to area and power. However, the results reported are for the controlpath only (which constitutes 0.6% of the total design) and hence the overall area and power overheads are 0.32% and 0.07%, respectively.

An ISCAS benchmark s298 circuit is a traffic light controller circuit generating patterns of red, yellow and green lights in a continuous sequence. It has several modes of operation: normal, fast and blinking resulting in 8 different control signals and a mod 10 counter as a control circuit. The functionality of the s298 benchmark circuit has been identified through reverse engineering and presented as high-level models (ISCAS High-Level Models). We used this information to obtain the control signals necessary for obfuscation. In the obfuscated circuit, the sizes of the delay counter and the final counter were of size $\log_2 K$ and K, respectively, where K represents the key size. It is to be noted that any tool capable of performing this type of reverse engineering, will be able to identify sequential elements and derive control signals. Fixed and dynamic obfuscation were applied to these signals using multiplexers and synthesize the resulting circuits to generate results shown in Table VII. Significant improvement in time to attack was observed compared to the fixed obfuscation, indicating the applicability of the proposed obfuscation techniques. However, since the circuit is small, the overheads are high.

The Ethernet IP core is one of OpenCore modules (Ethernet MAC 10/100 Mbps) and functions as a Media Access Controller (MAC) by connecting to the Ethernet PHY chip on one side and the Wishbone SoC bus on the other side. MAC Layer operations of transmitting, receiving, CRC generation and CRC check etc. at supported speeds of 10 and 100 Mbps bit rate are performed with this IP core. Both the transmit and receive modules of this IP have control signals derived from counters. For example the transmit module has Nibble counters (16-bit), Byte counters (16-bit), CRC counters (3-bit) etc. which can be used for control flow modifications and dynamic obfuscation. In the obfuscated circuit, the sizes of the delay counter and the final counter are of size $\log_2 K$ and K, respectively, where K represents the key size. The results of application of obfuscation to the transmit module are reported in Table VII. Significant improvement in security after application of dynamic obfuscation is observed mainly because of the highly control-driven nature of the design and availability of large counters. Specifically, the time to attack is increased to 6,133,565,802 years with a key size of 32 bits compared to 21.47 s with fixed obfuscation. The overall overheads due to obfuscation are also observed to be 0.93% (area) and 0.79% (power). Hence, the proposed obfuscation is proved to be highly successful.

In summary, three different examples of circuits on which the proposed obfuscation can be applied have been discussed. The time to attack is significantly improved in all cases. The overhead of obfuscation is high if the circuit size is small, but remains constant even for larger circuit size, mainly dominated by the additional circuits incorporated for trigger generation and combination. Thus, for most practical circuits, the technique of obfuscation incurs low overheads. Finally, the availability of control flow information is necessary for the application of control flow obfuscation and its subsequent conversion to time-varying and dynamic obfuscation. Design documentation or tools which identify sequential elements can be used to obtain this information.

The overheads of hybrid obfuscation can be inferred from Table VII, depending on the size of key at level 1 and level 2. For example, if key size is 8 and size of K1=4, size of K2=4, then the total overhead is the sum of the overhead values of dynamic and fixed obfuscation schemes obtained from the row indicating Key size 4. Because smaller trigger circuits are used for the dynamic part (e.g., 4 key bits instead of 8 key bits), the hybrid obfuscation scheme using 8 key bits has an overhead almost equal to the dynamic obfuscation using 4 key bits. This decrease in overhead comes at a cost of a decrease in security, as was observed from the security analysis discussed above. Hence, the hybrid obfuscation scheme exhibits both security and overhead values between that of fixed and dynamic obfuscation techniques.

The design of trigger generation circuits discussed above (e.g., FIG. 10) is just one among a possible set of configurations. For example, an alternate design may be configured to utilize a second random number generator instead of the final counter 1008, for example, as illustrated by the exemplary trigger generation circuit 1500 shown in FIG. 15. Accordingly, the trigger generation circuit 1500 includes an activation part 1502 having an activation signal output 1503, a delay counter 1504 having an overflow output 1506, a

TABLE VII

Comparison of the Overhead and Time to Attack of Dynamic and Fixed Obfuscation for Various Sequential Circuits with Different Activation Rates M

| Key | Mux size | Dynamic mode of obfuscation | | | Fixed mode of obfuscation [18] | | |
|---|---|---|---|---|---|---|---|
| | | Area overhead | Power overhead | Brute-Force attack time (cycles) | Area overhead | Power overhead | Brute-Force attack time (cycles) |
| Overhead of controlpath (0.6% of total) of a 1024-point folded, 2-parallel FFT circuit with M = 1024 | | | | | | | |
| 2 | 2:1 | 3.77% | 1.11% | 16,384 | 0.19% | 0.04% | 2 |
| 4 | 2:1 | 7.50% | 1.78% | 524,288 | 0.43% | 0.05% | 8 |
| 8 | 2:1 | 13.96% | 3.45% | 268,435,456 | 0.97% | 0.5% | 128 |
| 16 | 4:1 | 29.05% | 6.45% | $3.51 \times 10^{13}$ | 1.56% | 0.78% | 32,768 |
| 30 | 4:1 | 53.55% | 12.41% | $1.88 \times 10^{22}$ | 3.23% | 1.22% | 536,870,912 |
| Overhead of Traffic light controller (s298) of ISCAS'89 sequential benchmark circuits with M = 10 | | | | | | | |
| 2 | 2:1 | 24.50% | 20.39% | 160 | 2.33% | 13.72% | 2 |
| 4 | 2:1 | 49.24% | 36.86% | 5,120 | 4.08% | 15.29% | 8 |
| 8 | 2:1 | 62.66% | 43.14% | 2,621,440 | 7.70% | 23.53% | 128 |
| Overhead of transmit module (1.7% of total) of Ethernet IP core - OpenCores platform with M = 65536 | | | | | | | |
| 2 | 2:1 | 3.31% | 3.96% | 1,048,576 | 0.18% | 0% | 2 |
| 4 | 2:1 | 8.41% | 8.91% | 33,554,432 | 0.23% | 0.43% | 8 |
| 8 | 2:1 | 16.12% | 15.84% | 17,179,869,184 | 3.16% | 0.99% | 128 |
| 16 | 2:1 | 29.11% | 29.70% | $2.24 \times 10^{15}$ | 4.82% | 1.17% | 32768 |
| 32 | 4:1 | 55.06% | 46.53% | $1.93 \times 10^{25}$ | 6.68% | 2.97% | 2,147,483,648 | trigger generator 1514, and a random number generator 1515 configured to output a random number 1516 (rng1), each of which generally operate as described above with regard to the corresponding elements of FIG. 10. However, the final counter (1008) is replaced with a random number generator 1518 that receives the output 1506 from the delay counter 1504 and generates a random number 1520 (rng2) at each overflow of the delay counter 1504. The trigger generator 1514 receives the random number 1520 (rng2), the delay counter output 1506 (cntd) and the random number 1516 (rng1) generated by a separate random number generator, and outputs the trigger signals T1 and T2 based on desired conditions, such as Conditions 1 and 2 described above, but with the value of final counter (cntf) replaced with the value of the second random number 1520 (rng2) output from the random number generator 1518, for example. The advantage of using the second random number generator 1518 is a decrease in probability of occurrence of a trigger which will in turn increase the lower bound on the time to brute-force attack as given by Equation (8), for example.

When comparing the final counter (deterministic) to a random number generator (both of size K bits), the following probability is observed:

$$P(cntf = rng) = \frac{1}{2^K}$$

The final counter updates every MK cycles and hence the probability of occurrence of trigger is given by:

$$P(\text{occurrence of trigger}) = \frac{1}{MK2^K}$$

$MK2^K$ is the trigger period (T) for a 2:1 mux mapping. Hence, the probability of occurrence of trigger in one trigger period is 1.

Figure 15:
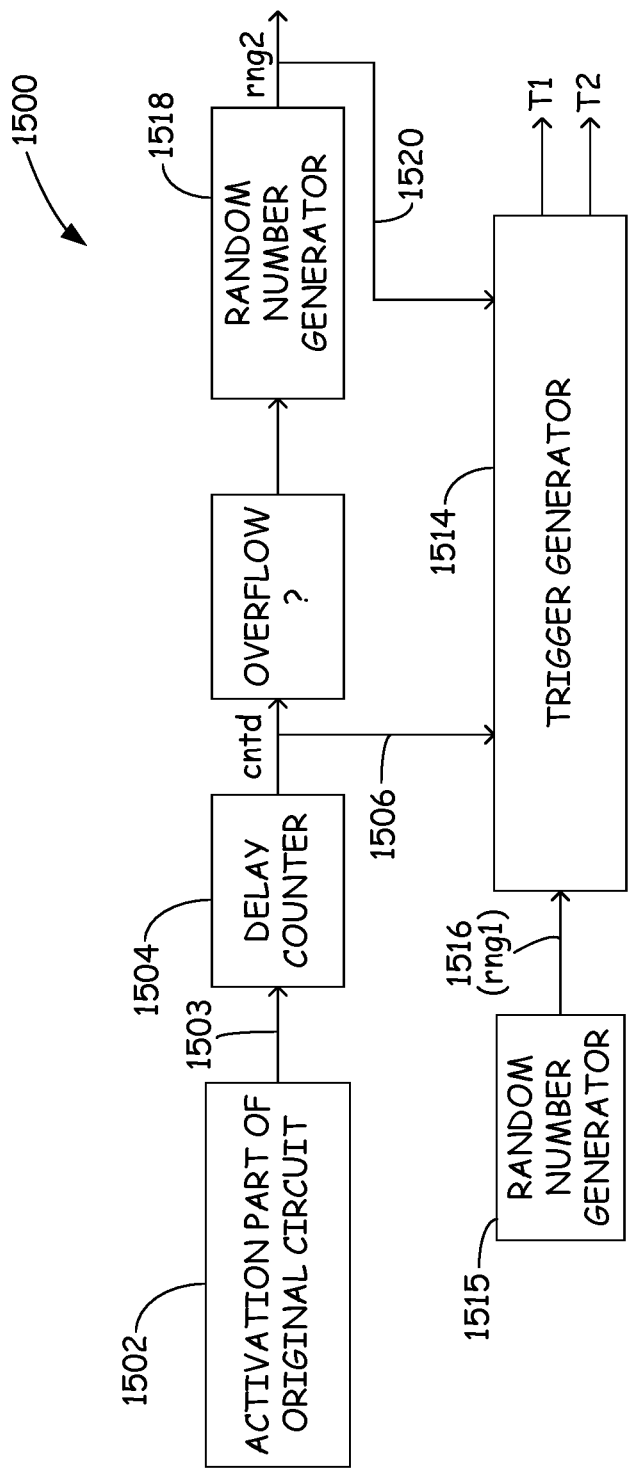
FIG. 15 is an exemplary sequential trigger generation circuit, in accordance with embodiments of the present disclosure.

When we have the system of FIG. 15, in which the first random number generator produces the random number 1516 (rng1), and the deterministic final counter is replaced with the random number generator 1518, which produces the random number 1520 (rng2), and assuming the random number 1520 (rng2) is also of size K bits and the two random number generators are independent, the probability equation is changed to the following:

$$P(rng1=rng2=a)=P(rng1=a)P(rng2=a)$$

Similar to the final counter 1008 of the trigger generation circuit 1000, the random number generator 1518 updates the random number 1520 (rng2) every MK cycles since it is connected to the delay counter output 1506. Hence, the probability of occurrence of trigger is given by:

$$P(\text{occurrence of trigger}) = \frac{1}{KM2^K}\frac{1}{2^K} = \frac{1}{KM2^{2K}}$$

Therefore, during a trigger period $T=MK2^K$ the probability of occurrence of trigger is equal to $$\frac{1}{2^K}.$$

Hence, the probability of occurrence of trigger is reduced to $$\frac{1}{2^K}$$

compared to the value of 1 if a deterministic counter is used. This results in an increase in the lower bound to brute-force attack given by:

$$\text{time\_lower\_bound(dynamic)}=MK2^{2K}$$

Thus, while two exemplary embodiments of trigger generation circuits have bene discussed, those skilled in the art understand that various other configurations can be generated using the concepts disclosed herein.

Although the present invention has been described with reference to preferred embodiments, workers skilled in the art will recognize that changes may be made in form and detail without departing from the spirit and scope of the invention. For example, though the ideas presented herein are demonstrated on sequential circuits only, these techniques are equally applicable to combinational circuits.

What is claimed is:

1. An apparatus for performing dynamic obfuscation to hide functionality of hardware, the apparatus comprising:
    a trigger generator circuit configured to generate a non-periodic trigger output; and
    a multiplexer configured to receive a valid control signal for controlling hardware at a first input and an obfuscated control signal at a second input and to output the valid control signal for controlling hardware in response to a first key value input to the multiplexer and the obfuscated control signal in response to a second key value input to the multiplexer;
    wherein the obfuscated control signal received at the second input and output by the multiplexer is the valid control signal for controlling hardware for a first value of the non-periodic trigger output and is an invalid control signal for controlling hardware for a second value of the non-periodic trigger output.

2. The apparatus according to claim 1, wherein the trigger generator circuit comprises:
    a trigger counter having a periodic trigger output; and
    a random number generator having a random number output;
    wherein the non-periodic trigger output is generated based on the periodic trigger output and the random number output.

3. The apparatus according to claim 2, wherein the trigger generator circuit is configured to generate the non-periodic trigger output having the first value more frequently than the non-periodic trigger output having the second value.

4. The apparatus according to claim 1, wherein the apparatus operates in a non-meaningful mode when the multiplexer outputs the obfuscated control signal, and the obfuscated control signal is set to the invalid control signal.

5. The apparatus according to claim 1, including a counter configured to output the valid control signal.

6. The apparatus according to claim 2, further comprising:
    an activation part of a circuit configured to periodically generate an activation signal output; and
    the trigger counter includes:
        a delay counter configured to count the activation signal outputs; and
        a final counter having a final count corresponding to a count of an overflow of the delay counter.

7. The apparatus according to claim 6, wherein the trigger generator circuit is configured to generate the non-periodic trigger output based on the final count and the random number output.

8. The apparatus according to claim 1, wherein the trigger generator circuit comprises:
   a first random number generator having a first random number output; and
   a second random number generator having a second random number output;
   wherein the non-periodic trigger output is generated based on the first and second random number outputs.

9. The apparatus according to claim 8, further comprising:
   an activation part of a circuit configured to periodically generate an activation signal output; and
   the trigger generator circuit includes a delay counter configured to count the activation signal outputs and having an overflow output;
   wherein the second random number generator generates the second random number output in response to the overflow output.

10. A method for performing dynamic obfuscation to hide functionality of hardware, the method comprising:
    generating a non-periodic trigger output using a trigger generator;
    setting an obfuscated control signal at a first input of a multiplexer to a valid control signal for controlling hardware for a first value of the non-periodic trigger output and to an invalid control signal for controlling hardware for a second value of the non-periodic trigger output;
    applying the valid control signal to a second input of the multiplexer;
    outputting the valid control signal from the multiplexer in response to a first key value input to the multiplexer and the obfuscated control signal from the multiplexer in response to a second key value input to the multiplexer; and
    controlling hardware based on the output from the multiplexer.

11. The method according to claim 10, wherein generating a non-periodic trigger output comprises:
    generating a periodic trigger output using a trigger counter;
    generating a random number output using a random number generator; and
    generating the non-periodic trigger output based on the periodic trigger output and the random number output.

12. The method according to claim 11, wherein generating the non-periodic trigger output comprises generating the non-periodic trigger output having the first value more frequently than the non-periodic trigger output having the second value.

13. The method according to claim 10, wherein controlling the hardware comprises controlling the hardware in a non-meaningful mode when the multiplexer outputs the obfuscated control signal, and the obfuscated control signal is set to the invalid control signal.

14. The method according to claim 10, including generating the valid control signal using a counter.

15. The method according to claim 11, further comprising:
    periodically generating an activation signal output using an activation part of the apparatus; and
    generating the periodic trigger output comprises:
        counting the activation signal outputs using a delay counter; and
        counting an overflow of the delay counter using a final counter.

16. The method according to claim 15, wherein generating the non-periodic trigger output comprises generating the non-periodic trigger output based on a count of the final counter and the random number output.

17. The method according to claim 10, wherein generating a non-periodic trigger output comprises:
    generating a first random number output using a first random number generator;
    generating a second random number output using a second random number generator; and
    generating the non-periodic trigger output based on the first and second random number outputs.

18. The method according to claim 17, further comprising:
    periodically generating an activation signal output using an activation part; and
    counting the activation signal outputs using a delay counter;
    wherein generating the second random number output comprises generating the second random number output in response to an overflow output from the delay counter.

* * * * *